(No Model.)
E. EAST.
CULTIVATOR.
No. 381,002. Patented Apr. 10, 1888.
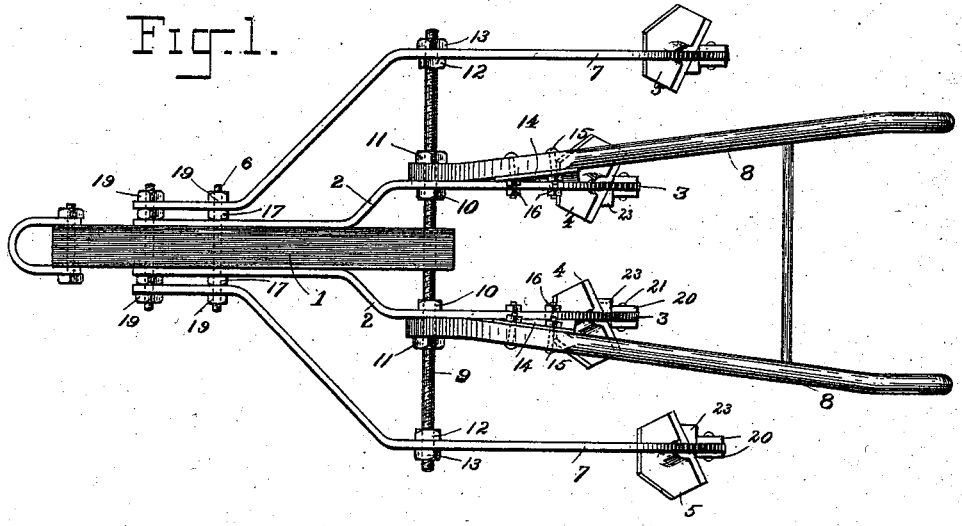
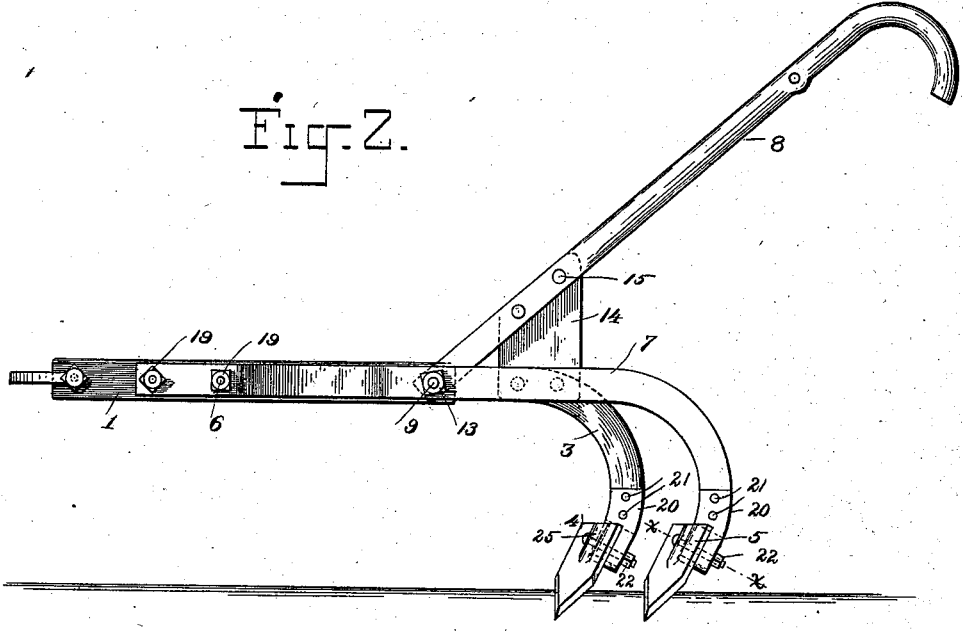
WITNESSES:
John F. Nelson.
E. Arthur.
INVENTOR:
Elias East.
BY Knight Bros.
ATTORNEYS.

UNITED STATES PATENT OFFICE.

ELIAS EAST, OF ARMOUR, TEXAS.

CULTIVATOR.

SPECIFICATION forming part of Letters Patent No. 381,002, dated April 10, 1888.

Application filed December 8, 1887. Serial No. 257,334. (No model.)

*To all whom it may concern:*

Be it known that I, ELIAS EAST, a citizen of the United States, residing at Armour, county of Limestone, and State of Texas, have invented certain new and useful Improvements in Cultivators, of which the following is a specification, reference being had to the accompanying drawings, which form a part of this application, and in which—

Figure 1 is a plan view of my improved device. Fig. 2 is a side elevation of the same. Fig. 3 is a section on the line *x x*, Fig. 2.

1 is the main or draft beam of the cultivator, to each side of which is secured by means of bolts 6 a bar, 2, which bars project rearwardly, and are preferably curved downwardly at their rear ends in order to form shanks 3 for the shovels 4. These bars are bent outwardly from the beam, so as to bring the shovels at the proper distance asunder. The shovels 4 are the inside and forward shovels. The outside and rear shovels, 5, are secured to the draft-beam by means of bent bars 7, which are bolted to the beam on top of the other bars by means of the same bolts, and which bars are identical with the bars 2, with the exception that they are a little longer and are bent outward farther, so as to bring the rear shovels on the outside of the path of the others. The bolts 6, which secure the bars 2 7 to the central beam, 1, are screw-threaded at both ends, and are provided with a set of nuts for each bar. The bolt is passed through the bars 2 and the beam, and the former are firmly secured by the nuts 17 on each side. Then the bars 7 are placed on these nuts over the projecting ends of the bolts, and are secured by means of the nuts 19. This is for convenience in removing one or both of the outside shovels without disturbing the others.

Passing through openings in the rear ends of the bars 2 7 and through the lower ends of the handles 8, which are outside of the bars 2, is a rod, 9, which is screw-threaded at each end, as shown. Screwed on this rod between the bars 2 2 are two nuts, 10, one bearing against each of the said bars, and on the said rod outside of the handles 8 are nuts 11, one bearing against each handle. These nuts 10 11, when screwed toward each other, firmly clamp the bars 2 and the handles together and to the frame. The bars 7, which carry the outside shovels, 5, are held in position in an analogous manner by means of nuts 12 13, one on each side; and it will be noted that in my device it is only necessary to lengthen the rod 9 and the bolts 6 to enable the attachment of any number of shovels.

The handles are retained at the desired inclination by means of the plates 14, which are secured to the handles by means of bolts or rivets 15 and to the shanks of the shovels 4 by means of bolts 16.

Bolted to the lower end of each of the shanks by means of the bolts 21 is a loop, 20, which forms a vertical slot, through which a bolt, 22, passes for securing the shovel in place. This vertical slot affords means whereby the shovel may be adjusted vertically on the shank, and thereby regulate the depth to which it is desired to have the shovel enter the soil.

In some instances it is desired to throw the soil toward and in other instances it is desired to throw the soil from the hill or row being cultivated, and as a means for accomplishing both objects I provide a wedge, 23, which is provided with a slot, 24, and which I insert between the shovel and the loop 20, with the bolt 22 passing through the said slot 24, so as to turn the shovel at a greater or less angle to the row. The shovel is provided with a central bead or semicircular rib, 25, through which a slot is made for the insertion of the bolt 22, and which is for the purpose of affording a bearing for the head of said bolt when the shovel is turned at a greater or less angle to the central beam.

It will be seen that the shovel may be slanted in either direction by merely shifting the butt of the wedge to the desired side by rotating it on the bolt 22.

Having thus described my invention, the following is what I claim as new therein and desire to secure by Letters Patent:

1. The combination, with a flat shovel and a shank, of the bead 25 on said shovel, having a transverse slot therethrough, a slotted wedge inserted between said shovel and shank, and a bolt passing through said bead, wedge, and shank, substantially as set forth.

2. In a cultivator, the combination, with the central draft-beam, of the bars 2, arranged one on each side of the said beam and having their rear ends bent outward therefrom and curved downward for carrying shovels, the bolts 6, passing through said beam and bars and having projecting screw-threaded ends, nuts 17 on said bolts clamping said bars and beam together, the bars 7, resting upon the nuts 17 and having the bolts 6 passing therethrough, and being bent outward and downward at their rear ends for carrying the shovels, and nuts 19 on the outer ends of the bolts 6, clamping bars 7 to nuts 17, a screw-threaded rod passing through said central beam and bars 2 7, and nuts on said rod on both sides of each of the bars 2 7, for holding them in place, essentially as set forth.

ELIAS EAST.

Witnesses:
 JAMES ARMOUR,
 T. N. GANEY.